(12) United States Patent
Brates et al.

(10) Patent No.: US 8,212,496 B2
(45) Date of Patent: Jul. 3, 2012

(54) END-OF-LIFE PROTECTION CIRCUIT AND METHOD FOR HIGH INTENSITY DISCHARGE LAMP BALLAST

(75) Inventors: Nanu Brates, Winchester, MA (US); Bhavinkumar Shah, Burlington, MA (US); Yiyoung Sun, Beverly, MA (US)

(73) Assignee: Panasonic Corporation, Osaka (JP)

( * ) Notice: Subject to any disclaimer, the term of this patent is extended or adjusted under 35 U.S.C. 154(b) by 325 days.

(21) Appl. No.: 12/623,855

(22) Filed: Nov. 23, 2009

(65) Prior Publication Data

US 2011/0121747 A1 May 26, 2011

(51) Int. Cl.
H05B 37/02 (2006.01)
(52) U.S. Cl. .................. 315/291; 315/307; 315/360
(58) Field of Classification Search ........... 315/209 R, 315/224–225, 247, 291, 307, 360
See application file for complete search history.

(56) References Cited

U.S. PATENT DOCUMENTS

| | | | |
|---|---|---|---|
| 5,808,422 A * | 9/1998 | Venkitasubrahmanian et al. | ............ 315/225 |
| 2002/0047609 A1 | 4/2002 | Weng | |
| 2002/0190665 A1 | 12/2002 | Sun | |
| 2005/0093477 A1 * | 5/2005 | Shi | ............... 315/224 |
| 2007/0024207 A1 * | 2/2007 | Harada et al. | ............ 315/246 |
| 2009/0261749 A1 | 10/2009 | Fukuda et al. | |
| 2009/0267517 A1 | 10/2009 | Tanaka et al. | |
| 2009/0273304 A1 | 11/2009 | Fukuda | |
| 2010/0026189 A1 * | 2/2010 | De Krijger et al. | ........... 315/129 |
| 2010/0327763 A1 * | 12/2010 | Yao et al. | ............ 315/250 |
| 2011/0006699 A1 * | 1/2011 | Nerone | ............ 315/250 |

* cited by examiner

Primary Examiner — Tung X Le
(74) Attorney, Agent, or Firm — Greenblum & Bernstein, P.L.C.

(57) ABSTRACT

An apparatus and method for detecting an end of life (EOL) condition of a lamp that exhibits a re-ignition behavior. A voltage is applied to the lamp to cause the lamp to start emitting light, and a lamp re-ignition voltage to normal lamp voltage difference after a mask-off period expires is monitored. The lamp is determined to have reached the EOL condition when a predetermined percentage of high difference half cycles occur during a set number of lamp voltage half cycles that are measured during a measurement window. The method continuously monitors the lamp re-ignition voltage to normal lamp voltage difference and records whenever the lamp re-ignition voltage to normal lamp voltage difference is higher than the re-ignition difference threshold level at any lamp voltage half cycle. An EOL lamp is detected when a predetermined number of high difference half cycles occurs in a set total number of lamp voltage half cycles measured in a rolling measurement window.

17 Claims, 6 Drawing Sheets

$\Delta V\_re\text{-}ig1 => threshold$
$\Delta V\_re\text{-}ig2 = 0$
$\Delta V\_re\text{-}ig3 = < threshold$
$\Delta V\_re\text{-}ig4 = 0$
$\Delta V\_re\text{-}ig5 = 0$
$\Delta V\_re\text{-}ig6 => threshold$
$\Delta V\_re\text{-}ig7 => threshold$ ΔV_re-ig1 = > threshold
ΔV_re-ig2 = 0
ΔV_re-ig3 = < threshold
ΔV_re-ig4 = 0
ΔV_re-ig5 = 0
ΔV_re-ig6 = > threshold
ΔV_re-ig7 = > threshold

US 8,212,496 B2

END-OF-LIFE PROTECTION CIRCUIT AND METHOD FOR HIGH INTENSITY DISCHARGE LAMP BALLAST

BACKGROUND OF THE INVENTION

1. Field of the Invention

The present invention relates to an apparatus and method of an electronic ballast to ignite a high intensity discharge (HID) lamp. In particular, the present invention is directed to operating a good HID lamp with a square waveform voltage and current, and to shutdown (e.g., turn OFF) a ballast associated with the HID lamp so as to terminate electrical output power to the HID lamp when an end-of-life (EOL) condition of the HID lamp is detected, and to then re-engage the ballast to re-supply electrical power to the HID lamp after a predetermined period of time (such as, for example, a few minutes) passes from the shutdown. During operation of the HID lamp, a predetermined lamp voltage, such as, but not limited to, for example, a low frequency, square wave lamp voltage, is continuously monitored. The level of a difference between a lamp re-ignition voltage and a normal lamp voltage is calculated every lamp voltage half cycle and compared to a series of pre-defined, graduated threshold levels of the difference of the lamp re-ignition voltage and the normal lamp voltage. Whenever the lamp re-ignition voltage to normal lamp voltage difference is higher than a threshold level of the lamp re-ignition voltage to normal lamp voltage difference, it is recorded. The HID lamp is determined to have reached its EOL condition when the number of records in a rolling measurement window becomes greater than a pre-defined percentage. At that time, the ballast is turned OFF to discontinue (terminate) the electrical output power supply to the HID lamp.

According to a preferred embodiment of the present invention, a frequency of the low frequency, square wave voltage and current is generally above 10 Hz and below 1000 Hz. However, this upper range and/or lower range may be varied without departing from the spirit and scope of the invention.

2. Background

As technology evolves, lamp manufacturers are developing smaller and more compact high intensity discharge lamps to satisfy the needs of end users. For example, some lamps are designed with a miniaturized fixture, in which a fixture protective lens is not required. When the lamp (e.g., an arc tube lamp) leaks, a gas, such as, but not limited to, for example, an argon gas from the lamp or when an outer envelope leaks, a nitrogen/oxygen gas mixture, etc. is released in a space between the arc tube lamp and an outer jacket, which is typically a vacuum. A resulting outer jacket gas pressure of the, for example, argon gas is a function of a numerical ratio of an arc tube volume to an outer jacket inner volume. Because of a relatively large outer jacket inner volume compared to the arc tube lamp volume, the resulting outer jacket gas pressure (e.g. argon) is significant higher than the vacuum. As a result, electrically insulating properties of the vacuum are compromised, and a breakdown voltage of the outer jacket is substantially reduced, such that stem lead arcing can occur when an ignition voltage is applied to the lamp.

SUMMARY OF THE INVENTION

According to an object of the present invention, a method is disclosed to detect an end-of life (EOL) condition of a lamp and to shut off the ballast output power without prematurely shutting off the ballast output power to a normal lamp during its service life. The present invention is effective to detect an EOL lamp regardless of whether a resonant start topology HID ballast or a pulse start topology HID ballast is employed.

According to an advantage of the present invention, the ballast is re-started after the passage of a predefined rest time, such as, for example, a few minutes rest after an EOL lamp detection shutting down operation, guaranteeing a true EOL condition was encountered.

According to the instant invention, a threshold level of re-ignition to normal lamp voltage difference from the lamp start is reduced, such that an EOL lamp can be differentiated from a lamp in normal service life whose re-ignition characteristics diminishes over time after starting.

According to the present invention, a statistical calculation is used to discriminate (differentiate) between an EOL lamp and a lamp in service life when connected to the output of the HID ballast, by examining how many over-the-threshold re-ignition differences have occurred during a rolling, given measurement window.

According to an object of the instant invention, a method detects an end of life (EOL) condition of a lamp that exhibits a re-ignition behavior, by applying a voltage to the lamp to cause the lamp to start emitting light, monitoring a lamp re-ignition voltage to normal lamp voltage difference after a mask-off period expires, and determining that the lamp has reached the EOL condition when a predetermined percentage of high difference half cycles occur during a set number of lamp voltage half cycles that are measured during a measurement window that may be, if desired, varied over time.

According to an advantage of the invention, the lamp is determined to have reached the EOL condition when a difference of a measured lamp half voltage cycle exceeds a predetermined threshold level. In this regard, the predetermined threshold level may be reduced over time.

According to another advantage of the invention, an occurrence of the monitored lamp re-ignition voltage to normal lamp voltage difference exceeding a threshold of re-ignition to normal lamp voltage difference is recorded to, for example, an element of an array.

According to the disclosed invention, the applying of a voltage to the lamp may be terminated when the predetermined percentage of high difference half cycles during the set number of lamp half voltage cycles exceeding a predetermined threshold level is reached. In this event, the voltage to the lamp may be re-applied to cause the lamp to re-start emitting light after a pre-defined rest period elapses.

According to an object of the instant invention, an apparatus is disclosed that powers a lamp and detects an end of life (EOL) condition of the lamp. The apparatus includes a ballast that applies a voltage to the lamp to cause the lamp to start emitting light, and an EOL determiner that determines whether the lamp has reached the EOL condition. The EOL determiner includes a detector that detects a value representing the voltage applied to the lamp at a predetermined half cycle after an expiration of a mask-off period, a re-ignition calculator that performs a re-ignition calculation, and a determiner that determines that the lamp has reached the EOL condition when a predetermined number of high difference half cycles occur during a set number of lamp voltage half cycles measured during a measurement window. The EOL determiner may additionally include a threshold setter to set a re-ignition threshold to a predetermined value, which may be, if desired, reduced over time.

According to another object of the invention, an end of life (EOL) condition of a lamp that exhibits a re-ignition behavior is detected by calculating a lamp re-ignition to normal lamp voltage difference of the lamp, and determining that the lamp has reached the EOL condition when a predetermined number of high difference half cycles occur in a set number of lamp voltage half cycles measured during a rolling measurement window. Thus, a statistical calculation is performed to discriminate between an EOL lamp condition and a lamp in service life condition by examining how many over-threshold re-ignitions have occurred over the rolling measurement window.

According to an advantage of the invention, a supply of electrical power from a ballast to the lamp may be terminated when a predetermined number of lamp re-ignition voltage to normal lamp voltage difference measurements exceed a threshold of the re-ignition to normal lamp voltage difference, and the predetermined number of lamp re-ignition voltage to normal lamp voltage difference measurements divided by the certain number of lamp re-ignition measurements exceeds a pre-defined percentage. In this event, the ballast may re-supply electrical power to the lamp after a predetermined rest time elapses. However, the supply of electrical power from the ballast to the lamp is permanently terminated when the ballast unsuccessfully attempts several times to re-supply electrical power to the lamp, which indicates that the lamp has reached the EOL condition.

According to an advantage of the invention, the re-ignition threshold, the pre-defined percentage and the rolling measurement window may each be adjustable.

BRIEF DESCRIPTION OF THE DRAWINGS

These and other objects, advantages and features of the present invention will become apparent from the following description thereof taken in conjunction with the accompanying drawings that illustrate specific embodiments of the present invention, in which.

DETAILED DESCRIPTION OF A PREFERRED EMBODIMENT

Figure 1:
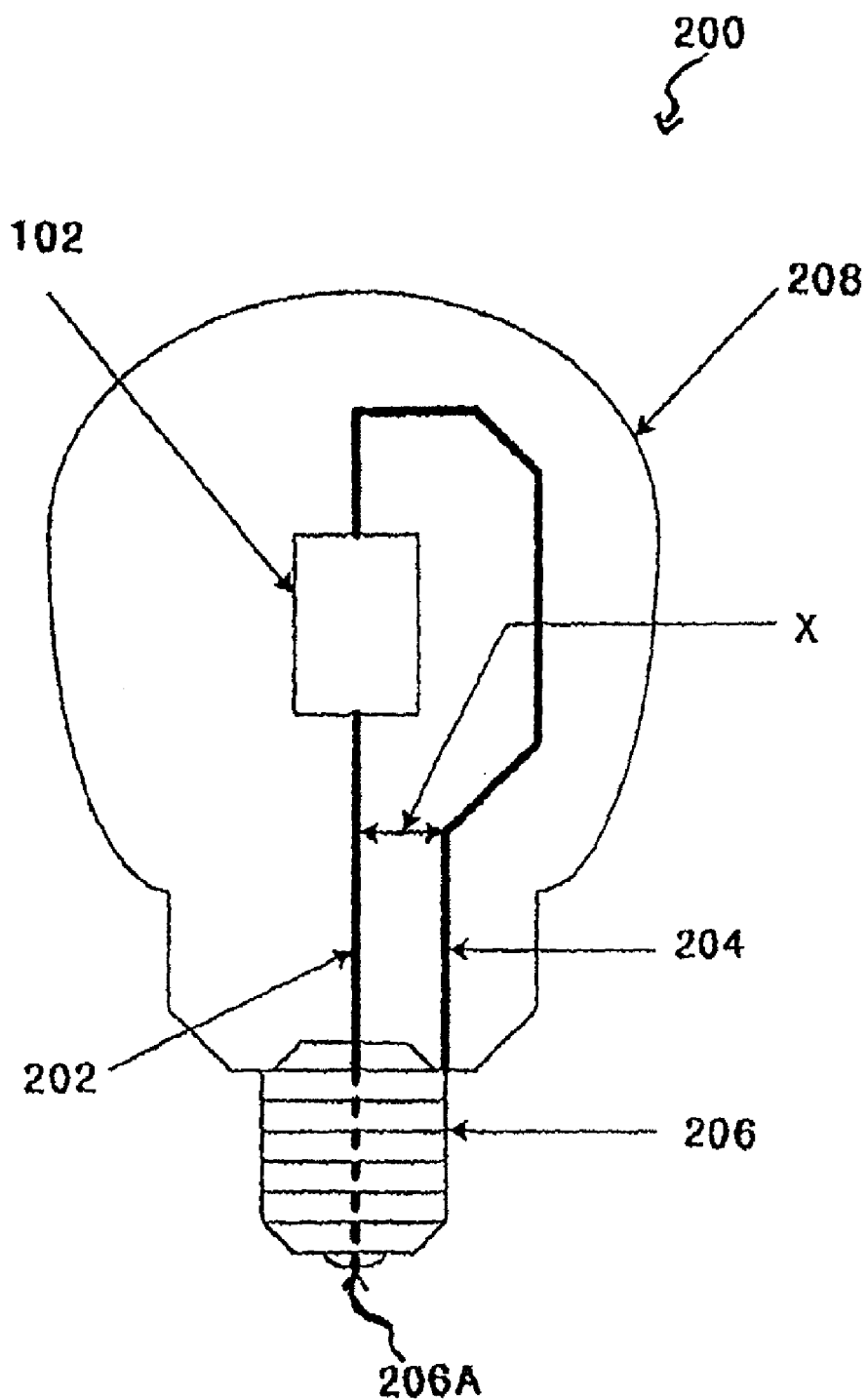
FIG. 1 illustrates a high intensity discharge (HID) lamp in which arcing occurs between stem leads when a gas leaks from an arc tube of the lamp.

FIG. 1 is an illustration of a typical HID lamp 200. Arc tube 102 of HID lamp 200 is electrically connected to a first stem lead 202 and a second stem lead 204. The stem leads 202 and 204 are electrically connected to a center contact 206A and a screw shell 206, respectively. Electrical power (not shown) is supplied to the arc tube 102 via the stem leads 202 and 204 and screw shell 206 and center contact 206A. The arc tube 102 and the stem leads 202 and 204 are surrounded by an outer jacket 208. The stem leads 202 and 204 are spaced apart from each other by a predetermined distance x, so as not to cause an electrical short there between.

The outer jacket 208 forms a vacuum with respect to the various components housed therein. However, when a gas associated with the arc tube 102 escapes from the arc tube 102, stem lead arcing may occur. If electrical power that is supplied from an associated ballast (not shown in FIG. 1) to the HID lamp 200 is not reduced or terminated, the arcing between the stem leads 202 and 204 can melt metal feedthroughs (not shown) of the lead stems 202 and 204. Should this occur, the outer jacket 208 of the HID lamp 200 may separate from the screw shell 206, resulting in the lamp "falling" off a socket (not shown) into which the screw shell 206 was screwed into. This is a very serious safety concern, and efforts should be taken to avoid such an occurrence.

Figure 2A:
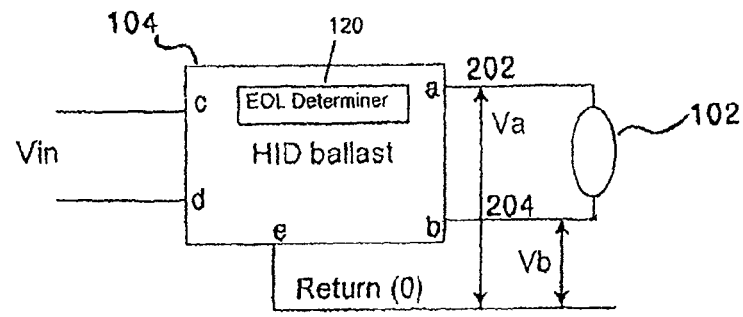
FIG. 2A illustrates a schematic diagram of the HID lamp of FIG. 1 connected to an HID ballast.

As shown in FIG. 2A, electrodes (stem leads 202 and 204) from the arc tube 102 of the HID lamp 200 are connected to ballast output terminals a and b of an HID ballast 104. An input voltage $V_{in}$ is inputted to the HID ballast via input terminals c and d. Terminal e serves as a return (ground).

A voltage Va is formed between terminals a and e, while voltage Vb is formed between terminals b and e. Thus, lamp voltage V_lamp applied to the arc tube 102 is equal to an absolute value of Va minus Vb.

In the disclosed embodiment, the HID ballast 104 includes an EOL determiner 120 that determines the EOL condition of the lamp 200. In the disclosed embodiment, the EOL determiner 120 controls an ON/OFF operation of the HID ballast 104, as will be discussed below. While the present invention is described with the EOL determiner 120 built into the HID ballast 104, it is understood that alternative methods of interfacing the EOL determiner 120 to the lamp 200 and/or HID ballast 104 may be implemented, such as, for example, providing the EOL determiner 120 external to the HID ballast 104, without departing from the scope and/or spirit of the present invention.

Figure 2B:
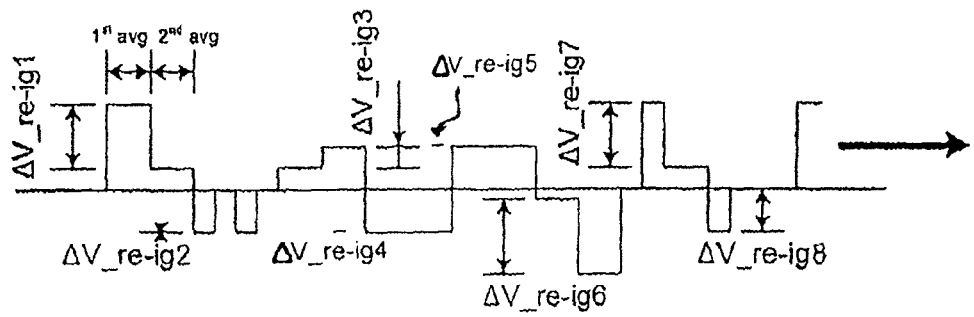
FIG. 2B illustrates a schematic waveforms and lamp voltage re-ignition calculations of the lamp of FIG. 2A.
Figure 2C:
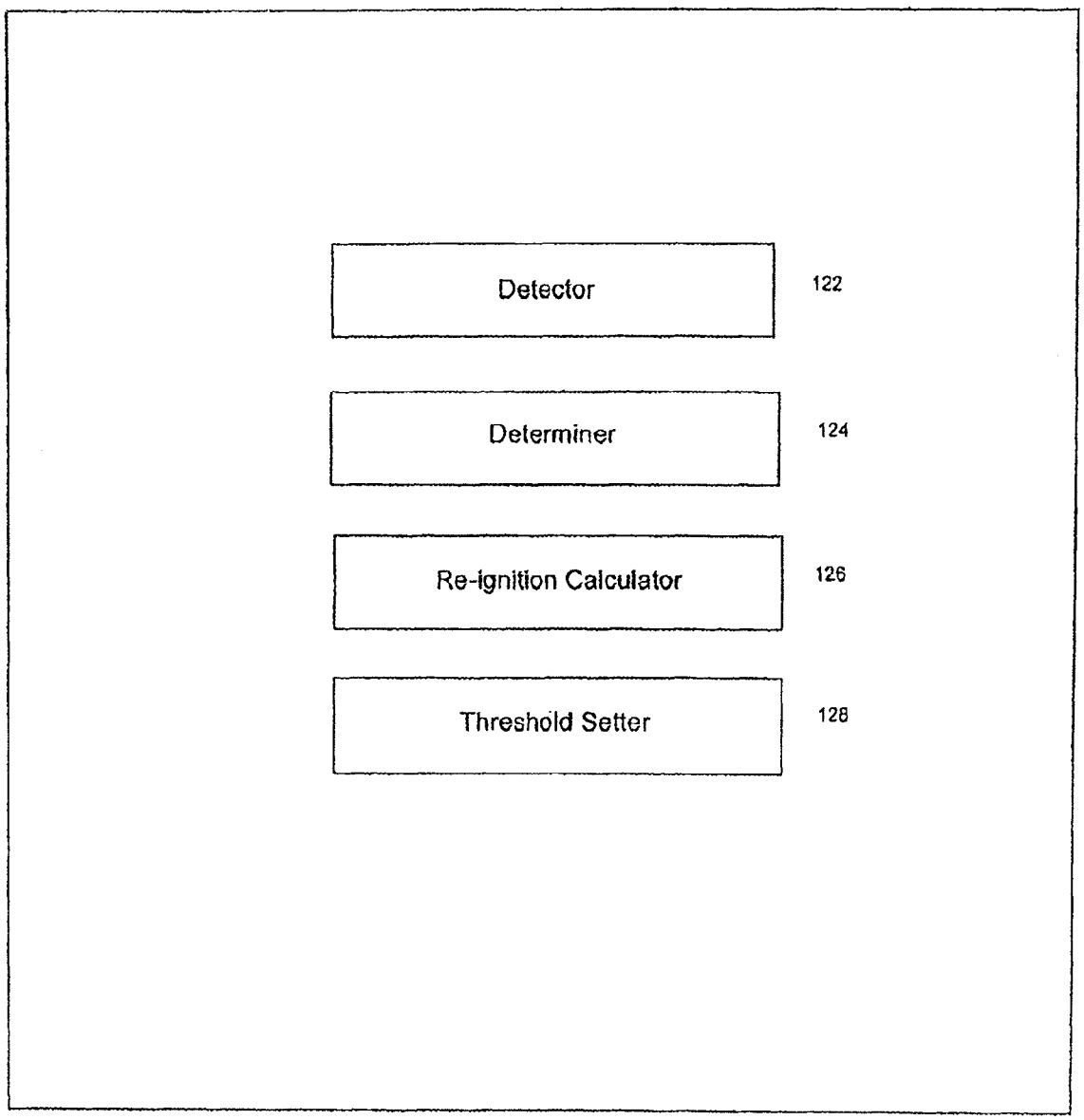
FIG. 2C illustrates a block drawing of an example of an end of life (EOL) determiner utilized by the current invention.

As shown in FIG. 2C, the EOL determiner 120 includes a detector 122, a determiner 124, a re-ignition calculator 126 and a threshold setter 128. The detector 122 detects a value of the voltage that is applied to the lamp 200 at predetermined timings after an expiration of a mask-off period (to be discussed below). The determiner 124 operates to determine whether predetermined time periods have passed, while the re-ignition calculator 126 performs various re-ignition calculations. The threshold setter 128 functions to reduce set re-ignition thresholds over time, in order to, for example, increase the sensitivity of EOL lamp detection. The operations of the various elements are described in detail below.

In the disclosed embodiment, the HID ballast 104 measures the lamp voltage V_lamp every half cycle, and a difference ΔV_lamp, of the lamp voltage within each cycle is calculated. ΔV_lamp is then compared with a pre-defined re-ignition difference threshold. When ΔV_lamp is higher than the pre-defined re-ignition difference threshold, the occurrence is recorded. This process is repeated until the total number of half cycles has been measured in a given rolling measurement window. The percentage of over-the-threshold half cycles is then calculated. When the result of the calculation is higher than a pre-defined percentage, the HID ballast 104 is instructed to discontinue the supply of output power to the lamp 200. Thus, the lamp 200 is extinguished. After the passage of a predefined rest interval, which may be, for example, a few minutes, the HID ballast will attempt a re-start operation.

If the percentage of over-the-threshold half cycles is lower than the pre-defined percentage, the first measurement is dropped. A new measurement is taken and compared with the re-ignition difference threshold and the result recorded. The percentage of the over-the-threshold half cycles is then recalculated. This process is repeated for a pre-determined time interval.

In the disclosed embodiment, the pre-defined re-ignition voltage threshold is varied over time from when the lamp is started. At an initial start-up, the re-ignition threshold is masked off to avoid a nuisance (e.g., erroneous) detection condition. After a period of time, the re-ignition threshold is gradually reduced. This is based on the fact that, for a good lamp, the level of lamp re-ignition voltage diminishes over time, while an EOL lamp re-ignition does not diminish over time completely in a time frame of seconds. If the detection circuit does not detect an over-the-threshold re-ignition right after the masked off period, an EOL lamp will be detected sooner or later, because of the re-ignition difference threshold reduction.

Figure 3:
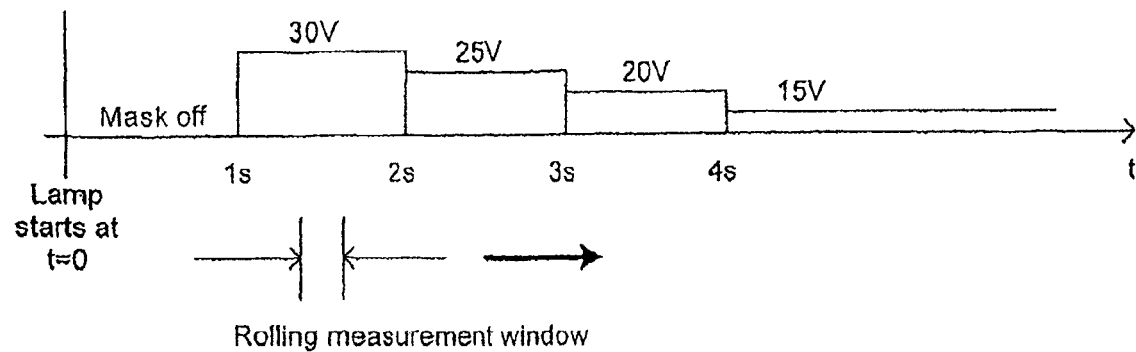
FIG. 3 illustrates an example of a rolling and graduated ΔV_lamp re-ignition thresholds.

FIG. 3 graphically illustrates a non-limiting example in which the re-ignition threshold difference threshold is reduced over time. FIG. 3, which is shown for illustration purposes only, illustrates four stages of re-ignition threshold reduction from thirty (30) volts to fifteen (15) volts during the first four (4) seconds after the lamp is started. It is noted that threshold levels, elapsed times for each re-ignition threshold level, and the rolling measurement window can all be intelligently adjusted depending upon the design, without departing from the scope and/or spirit of the present invention.

For example, the mask-off period can be set to be just one second, as shown in FIG. 3, or, alternatively, may be set to some other time period, such as, but not limited to, for example, two seconds. In FIG. 3, the thirty (30) volt threshold level is shown to last for one second. However, the voltage and/or threshold level can be set to another level, such as, for example, forty-five (45) volts and/or for a period of, for example, 1.5 seconds, without departing from the scope and/or spirit of the invention.

The rolling measurement window may also be adjusted. For example, when the lamp is first started, the window width can be set to, for example, thirty-two (32) cycles of lamp voltage or current. In order to increase the sensitivity of detection a period of time after the lamp is started, the window can be narrowed to, for example, twenty-four (24) cycles of lamp voltage or current. The initial re-ignition percent can be set at, for example, 80 percent and later reduced to, for example, 50 percent to increase the sensitivity of EOL lamp detection, assuming a lamp during its service life will have very low re-ignition difference. It is understood that all values disclosed herein are not critical to the operation of the present invention, and variations and changes may be made without deviating from the present invention.

Figure 4:
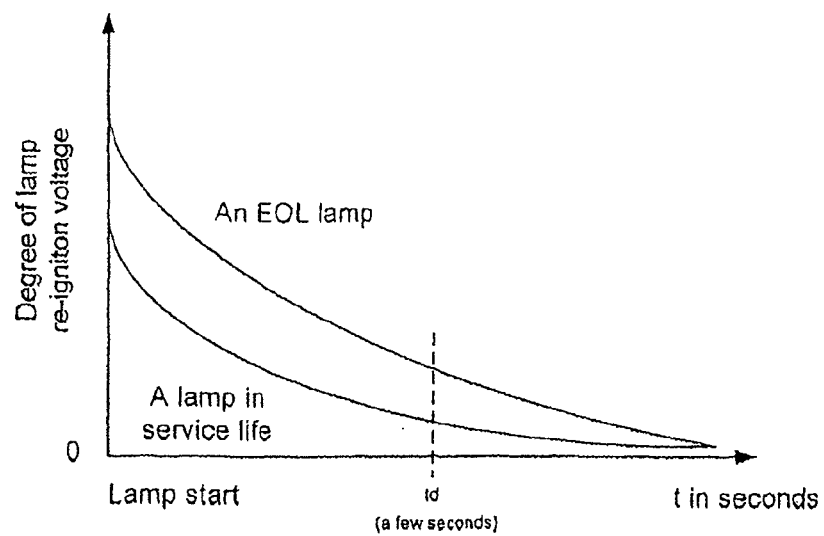
FIG. 4 illustrates a degree of lamp voltage re-ignition between a normal lamp and an EOL lamp.

The graduated re-ignition difference threshold reduction is based on the fact that, for a normal (i.e., good) lamp, re-ignition diminishes over time, while an EOL lamp re-ignition does not diminish over time, but rather reduces to a lower degree, as shown in FIG. 4. This can be determined by detecting the degree of lamp re-ignition voltage at a certain time td, before the two curves, shown in FIG. 4, merge.

Some good lamps during their service life will exhibit very severe re-ignition when they are initially started, comparable (similar) to that of an EOL lamp. In order to avoid prematurely shutting down the ballast output power when a good lamp is initially supplied with electrical power from the ballast, the initial re-ignition difference threshold level is set to a high enough value in the disclosed embodiment so as not to result in misjudging a good lamp still in its service life, while a final re-ignition difference threshold level is set low enough to ensure that the EOL lamp will be detected.

In a case where a premature shutdown does occur, the ballast will perform a re-start operation a predetermined period of time (such as, for example, a few minutes) after the ballast was shut down. A lamp that is still operable (e.g., an in-service life lamp) will start normally. If the ballast attempts to restart the lamp, without success, a certain number of times, the lamp is determined to be an EOL lamp, and the ballast ceases attempting to restart the lamp.

Figure 5:
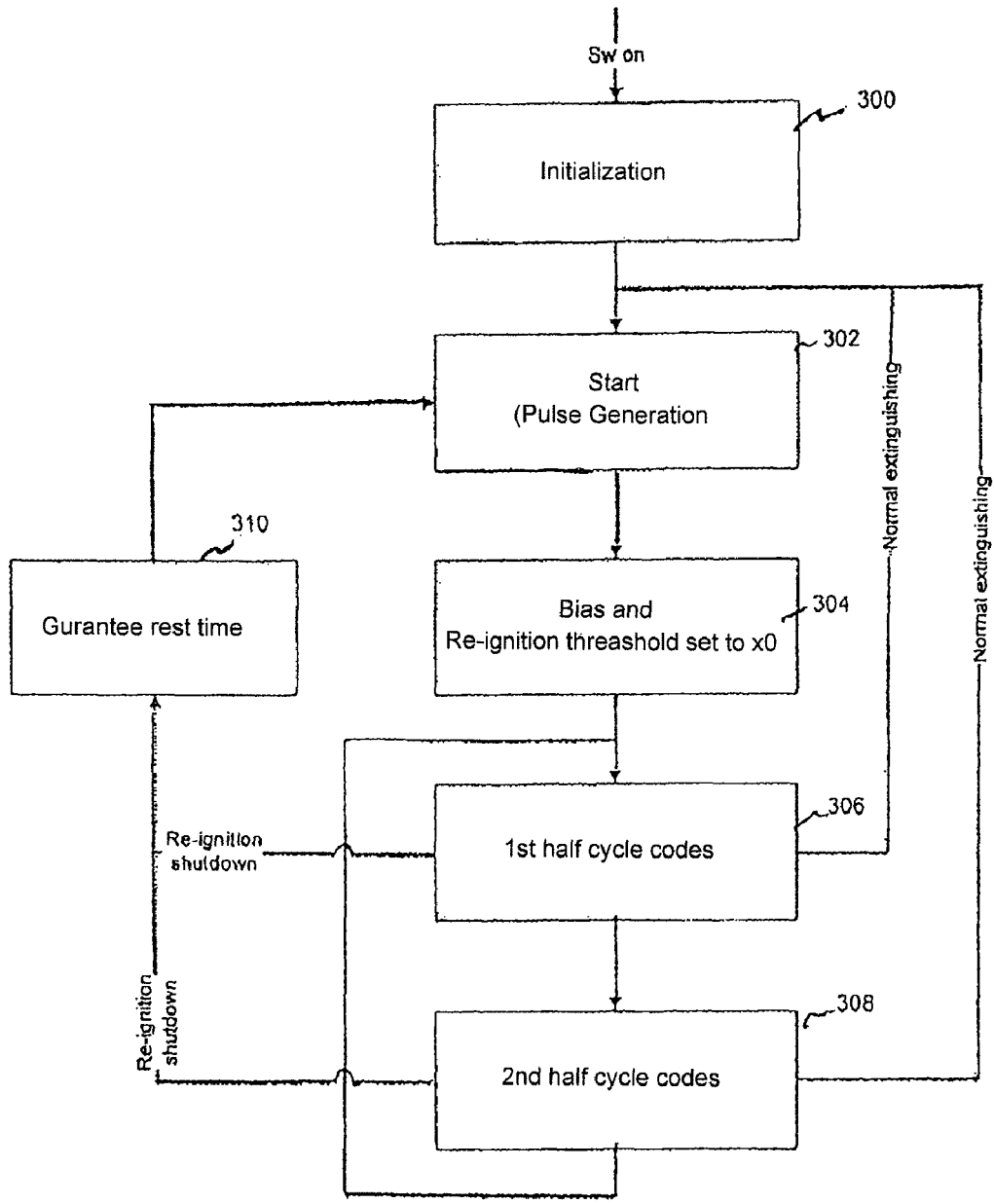
FIG. 5 illustrates an implementation example of a re-ignition method of the present invention.

FIG. 5 illustrates a block diagram of a disclosed embodiment for implementing a re-ignition detection method of the present invention. As shown in FIG. 5, re-ignition detection of the present invention is defined by tasks (operations) 300-310. However, it is understood that the tasks and the arrangement of the disclosed tasks may be changed without departing from the scope and/or spirit of the invention.

When electrical power is applied to HID ballast 104 to start the arc tube 102 (HID lamp 200), an initialization (task 300) is performed. A pulse generation task 302 is then executed. Thereafter, re-ignition threshold task 304 is executed to set re-ignition threshold levels to a desired level x0. First and second half cycle code tasks 306 and 308 are performed to produce the signal illustrated in FIG. 2B, in accordance with the discussion above. Should the calculated percentage results from tasks 306 and 308 be higher than a pre-defined percentage, the HID ballast 104 is shut down, so as to discontinue the supplying of electrical power to the HID lamp 200. A guarantee rest time task 310 is then executed to re-start (re-energize) the HID ballast 104 once a predefined rest interval passes.

Figure 6:
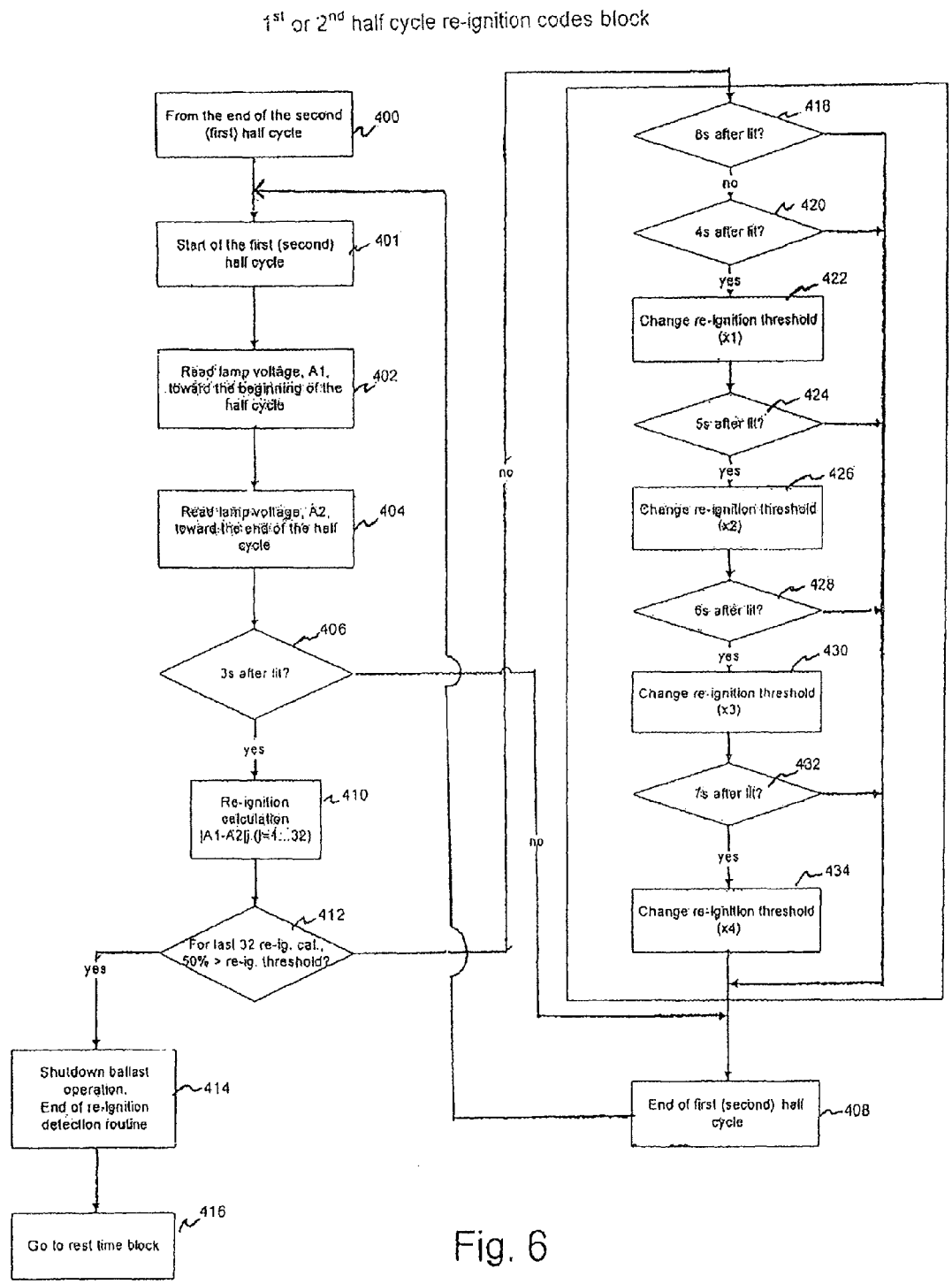
FIG. 6 illustrates a flowchart for performing first or second half cycle re-ignition code blocks depicted in the re-ignition method of FIG. 5.

FIG. 6 depicts the operation of the first and second half cycle re-ignition codes in greater detail. According to the disclosed embodiment, when a particular half cycle is completed, such as, for example, the second half cycle in step 400, the first half cycle is started at step 401 (alternatively, the second half cycle would be started at step 401 if the first half cycle is what was completed at step 400), so that the detector 122 detects a lamp voltage A1 at the beginning of the half cycle (step 402). Then, the detector 122 detects another lamp voltage A2 toward the end of the half cycle (step 404). At step 406, a determination is made by the determiner 124 as to whether a predetermined time period, such as, but not limited to, for example, three (3) seconds shown in FIG. 6, which corresponds to the mask-off period, has expired. When the determiner 124 determines that the mask-off period has not expired, processing proceeds to step 408 to end the half cycle, and then repeat steps 401 to 406, until such time as the mask-off period is determined to have expired.

When it is determined at step 406 that the mask-off period has expired, processing proceeds to step 410 for the re-ignition calculator 126 to perform the re-ignition calculation, as discussed above with respect to FIG. 2B. As was noted above, the re-ignition difference threshold can be varied over time. Above, it was discussed that the initial re-ignition percent is set to a first value, such as, for example, x0 (and may later be reduced to a final value, such as, for example, x4 in order to increase the sensitivity of EOL lamp detection) and that the rolling measurement window is set to thirty-two (32) cycles. The re-ignition calculation results obtained from step 410 are compared to the re-ignition threshold at step 412 by the determiner 124, to determine whether a predetermined percentage of the re-ignition calculations (shown, for example, as being a value of 50 percent) exceed the set re-ignition threshold. If the determination result is affirmative, processing proceeds to step 414 to shut down the HID ballast 104, end the re-ignition detection routine, and wait for the elapse of the predetermined rest time before attempting to restart the lamp (step 416).

On the other hand, if the determination result at step 412 is negative, processing proceeds to step 418, where the EOL determiner 120 determines whether a first period, such as, but not limited to, in the disclosed embodiment, of eight (8) seconds, has passed after the lamp was lit. An affirmative determination results in processing jumping to step 408, while a negative determination results in another determination being made, at step 420, as to whether a second period, such as, but not limited to, four seconds in the disclosed embodiment, has elapsed since the lamp was lit. When the second period (e.g., four (4) seconds) has elapsed, processing proceeds to step 422; otherwise processing proceeds to step 408.

At step 422, the re-ignition threshold is changed by the threshold setter 128 to re-ignition threshold x1 from the initial threshold x0. As discussed above with respect to FIG. 3, reducing the re-ignition threshold increases the sensitivity of EOL lamp detection. Thereafter, it is determined whether a third period, such as, but not limited to, five (5) seconds in the disclosed embodiment, has passed since the lamp was lit (step 424). If the determination is negative, processing jumps to step 408.

Once the third period (e.g., five (5) seconds in the disclosed embodiment) has passed since the lamp was lit, processing proceeds from step 424 to step 426, wherein the threshold setter 128 further reduces the re-ignition threshold to re-ignition threshold x2 from re-ignition threshold x1. Then, it is determined whether a fourth period, such as, but not limited to, six (6) seconds in the disclosed embodiment, has passed after the lamp was lit (step 428). If the fourth period has not passed, processing jumps to step 408.

However, when the fourth period has passed, processing proceeds to step 430, wherein the re-ignition threshold is reduced yet again by the threshold setter 128, to re-ignition threshold x3 from re-ignition threshold x2. In a manner similar to that described above, steps 401 through 430, as required, are repeatedly executed until such time as it is determined that a fifth period, such as, but not limited to, seven (7) seconds in the disclosed embodiment, has passed since the lamp was lit (step 432).

In the disclosed embodiment, once the fifth period after the lamp has been lit elapses, the re-ignition threshold is reduced by the threshold setter 128 to a final re-ignition threshold x4, the half cycle is completed, and a next half cycle can begin (steps 434 and 408).

In summary, a series of thresholds of the difference between the lamp re-ignition voltage and a normal lamp voltage are defined within a low frequency lamp voltage half cycle. The lamp re-ignition to normal lamp voltage difference is monitored from ignition of the lamp through its normal operation. After the lamp is started, the threshold of the difference between lamp re-ignition voltage and normal lamp voltage is gradually reduced in order to minimize misinterpretations of a good lamp (e.g., in service lamp) from an EOL lamp. The lamp voltage re-ignition difference is continuously monitored, and a record is made whenever the lamp voltage re-ignition difference exceeds the re-ignition difference threshold level within any lamp voltage half cycle. An EOL lamp is detected when a predetermined number of high difference half cycles occur in a set total number of lamp voltage half cycles measured in a rolling, given measurement window.

The instant invention employs graduated threshold levels. This minimizes the chance that a normal lamp within its service life will be erroneously determined to be an EOL lamp, or alternatively, that an EOL lamp will not be detected. Since both a good lamp (e.g. a normal lamp within its service life) and an EOL lamp exhibit lamp re-ignition of several seconds upon an initial application of electrical power to the lamp, and the re-ignition behavior of a good lamp diminishes relatively quickly after power-up, in comparison to an EOL lamp, reducing the re-ignition difference threshold levels over time ensures that only the EOL lamp will be detected. In this regard, the qualified re-ignition event is a percentage of all data collected and measured in a rolling window. Further, as the re-ignition during starting of the lamp is random, employing a statistical method to determine a qualified event, as taught by the present invention, yields better results than accumulative or consecutive counting methods that have been employed in the past.

While the disclosed embodiment has been described with reference to specific periods and number of re-ignition thresholds, it is understood that said periods and number of re-ignition thresholds are merely exemplary examples for purposes of explaining the present invention. Thus, variations may be made thereto without departing from the scope and/or spirit of the instant invention.

The present invention enables the detection of the EOL of a lamp regardless of whether a resonant start type HID ballast or a pulse start type HID ballast is employed. A resonant start type ballast generates a resonant ignition voltage at the very beginning of a power up cycle. As the resonant ignition voltage gradually increases, the lamp breaks down and the discharge quickly transitions from a glow discharge to an arc discharge. A run-up mode then follows. A pulse start type ballast superimposes an ignition pulse on every half cycle of the lamp voltage. Because a pulse width of the ignition pulse is much narrower than a resonant ignition voltage, a glow to arc transition in the pulse start type ballast is generally slower than is the case with the resonant start type ballast. More re-ignition can be seen in pulse start ballast.

While it is somewhat easier to detect the EOL of a lamp that employs the pulse start type ballast, as opposed to a lamp that employs the resonant start type ballast, the present invention is not affected by which starting method is used in the ballast design. When to begin monitoring the lamp voltage re-ignition is solely based on the lamp voltage. Generally speaking, when the lamp voltage is less than 300 volts root mean square (Vrms), the lamp has started.

The foregoing discussion has been provided merely for the purpose of explanation and is in no way to be construed as limiting the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and/or spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The methods described herein comprise dedicated hardware implementations including, but not limited to, application specific integrated circuits (ASIC), programmable logic arrays (PLA), digital signal processor (DSP) and other hardware devices constructed to implement the methods described herein. However, it is understood that the invention may be implemented in software that is executed by a processor, computer or dedicated integrated circuit (such as, for example, a PLA or DSP). Furthermore, alternative software implementations including, but not limited to, distributed processing or component/object distributed processing, parallel processing, or virtual machine processing can also be constructed to implement the methods described herein. In addition, although the present specification may describe components and functions implemented in the embodiments with reference to particular standards and protocols, the invention is not limited to such standards and protocols. Such standards are periodically superseded by faster or more efficient equivalents having essentially the same functions. Replacement standards and protocols having the same functions are considered equivalents.

What is claimed is:

1. A method for detecting an end of life (EOL) condition of a lamp that exhibits a re-ignition behavior, comprising:
    applying a voltage to the lamp to cause the lamp to start emitting light;
    monitoring a lamp re-ignition voltage to normal lamp voltage difference after a mask-off period expires;
    determining that the lamp has reached the EOL condition when a predetermined percentage of high difference half cycles occur during a set number of lamp voltage half cycles that are measured during a measurement window; and
    recording an occurrence of the monitored lamp re-ignition voltage to normal lamp voltage difference exceeding a threshold of re-ignition to normal lamp voltage difference.

2. The method of claim 1, wherein determining comprises:
    determining when a difference of a measured lamp half voltage cycle exceeds a predetermined threshold level.

3. The method of claim 2, wherein the predetermined threshold level is reduced over time.

4. The method of claim 1, wherein recording comprises writing the occurrence to an element of an array.

5. The method of claim 1, further comprising:
    varying the measurement window over time.

6. A method for detecting an end of life (EOL) condition of a lamp that exhibits a re-ignition behavior, comprising:
    applying a voltage to the lamp to cause the lamp to start emitting light;
    monitoring a lamp re-ignition voltage to normal lamp voltage difference after a mask-off period expires;
    determining that the lamp has reached the EOL condition when a predetermined percentage of high difference half cycles occur during a set number of lamp voltage half cycles that are measured during a measurement window; and
    terminating the applying a voltage to the lamp when the predetermined percentage of high difference half cycles during the set number of lamp half voltage cycles exceeding a predetermined threshold level is reached.

7. The method of claim 6, further comprising:
    re-applying the voltage to the lamp to cause the lamp to re-start emitting light after a pre-defined rest period elapses.

8. An apparatus that powers a lamp and detects an end of life (EOL) condition of the lamp, comprising:
    a ballast that applies a voltage to the lamp to cause the lamp to start emitting light; and
    an EOL determiner that determines whether the lamp has reached the EOL condition, the EOL determiner comprising:
        a detector that detects a value representing the voltage applied to the lamp at a predetermined half cycle after an expiration of a mask-off period;
        a re-ignition calculator that performs a re-ignition calculation; and
        a determiner that determines that the lamp has reached the EOL condition when a predetermined number of high difference half cycles occur during a set number of lamp voltage half cycles measured during a measurement window, wherein the ballast terminates applying the voltage to the lamp when the predetermined number of high difference half cycles during the set number of lamp voltage half cycles exceeding a predetermined threshold level is reached.

9. The apparatus of claim 8, wherein said EOL determiner further comprises a threshold setter that sets a re-ignition threshold to a predetermined value.

10. The apparatus of claim 9, wherein said predetermined value of said set re-ignition threshold is reduced over time.

11. A method for detecting an end of life (EOL) condition of a lamp that exhibits a re-ignition behavior, comprising:
    calculating a lamp re-ignition to normal lamp voltage difference of the lamp;
    determining that the lamp has reached the EOL condition when a predetermined number of high difference half cycles occur in a set number of lamp voltage half cycles measured during a rolling measurement window; and
    terminating a supply of electrical power to the lamp when a predetermined number of lamp re-ignition voltage to normal lamp voltage difference measurements exceed a threshold of the re-ignition to normal lamp voltage difference, and the predetermined number of lamp re-ignition voltage to normal lamp voltage difference measurements divided by the certain number of lamp re-ignition measurements exceeds a pre-defined percentage.

12. The method of claim 11, further comprising:
    re-supplying electrical power to the lamp after a predetermined rest time elapses.

13. The method of claim 12, further comprising:
    permanently terminating the supply of electrical power to the lamp when a predetermined number of unsuccessful attempts to re-supply electrical power to the lamp occur.

14. The method of claim 11, wherein the rolling measurement window is adjustable over time.

15. The method of claim 11, wherein the re-ignition threshold, the pre-defined percentage and the rolling measurement window are each adjustable.

16. A method for detecting an end of life (EOL) condition of a lamp that exhibits a re-ignition behavior, comprising:
    calculating a lamp re-ignition to normal lamp voltage difference of the lamp; and
    determining that the lamp has reached the EOL condition when a predetermined number of high difference half cycles occur in a set number of lamp voltage half cycles measured during a rolling measurement window, wherein determining comprises:
        performing a statistical calculation that discriminates between an EOL lamp condition and a lamp in service life condition by examining how many over-threshold re-ignitions have occurred over the a rolling measurement window.

17. An apparatus that powers a lamp and detects an end of life (EOL) condition of the lamp, comprising:
    a ballast that applies a voltage to the lamp to cause the lamp to start emitting light; and
    an EOL determiner that determines whether the lamp has reached the EOL condition, the EOL determiner comprising:

a detector that detects a value representing the voltage applied to the lamp at a predetermined half cycle after an expiration of a mask-off period;
a re-ignition calculator that performs a re-ignition calculation; and
a determiner that determines that the lamp has reached the EOL condition when a predetermined number of high difference half cycles occur during a set number of lamp voltage half cycles measured during a measurement window, wherein an occurrence of the monitored lamp re-ignition voltage to normal lamp voltage difference exceeding a threshold of re-ignition to normal lamp voltage difference is recorded.

* * * * *